(12) United States Patent
Wisbrun et al.

(10) Patent No.: US 11,150,094 B2
(45) Date of Patent: Oct. 19, 2021

(54) METHOD AND SYSTEM FOR OPTIMIZING THE PARKING SPACE SEARCH OF A VEHICLE, AND COMPUTER PROGRAM PRODUCT

(71) Applicant: Bayerische Motoren Werke Aktiengesellschaft, Munich (DE)

(72) Inventors: Richard Wisbrun, Ottobrunn (DE); Daniel Kotzor, Seefeld (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 239 days.

(21) Appl. No.: 15/996,565

(22) Filed: Jun. 4, 2018

(65) Prior Publication Data

US 2018/0274930 A1    Sep. 27, 2018

Related U.S. Application Data

(63) Continuation of application No. PCT/EP2016/081508, filed on Dec. 16, 2016.

(30) Foreign Application Priority Data

Dec. 18, 2015  (DE) .................... 10 2015 225 893.9

(51) Int. Cl.
*G01C 21/00* (2006.01)
*G01C 21/20* (2006.01)
(Continued)

(52) U.S. Cl.
CPC ......... *G01C 21/20* (2013.01); *G01C 21/3407* (2013.01); *G01C 21/3423* (2013.01);
(Continued)

(58) Field of Classification Search
CPC ........................ G01C 21/20; G01C 21/3617; G01C 21/3605; G01C 21/3679; G01C 21/3407;
(Continued)

(56) References Cited

U.S. PATENT DOCUMENTS

2005/0280555 A1* 12/2005 Warner, IV .............. G08G 1/14
340/932.2
2012/0161984 A1*  6/2012 Amir ................... G01C 21/3685
340/932.2
(Continued)

FOREIGN PATENT DOCUMENTS

EP    1 775 690 A1    4/2007
EP    2 587 220 A1    5/2013
(Continued)

OTHER PUBLICATIONS

International Search Report (PCT/ISA/210) issued in PCT Application No. PCT/EP2016/081508 dated Mar. 15, 2017 with English translation (seven pages).

(Continued)

*Primary Examiner* — Shardul D Patel
(74) *Attorney, Agent, or Firm* — Crowell & Moring LLP

(57) ABSTRACT

A method optimizes a parking space search for a vehicle. During the method, at least one solution option is ascertained, and an optimization solution is ascertained from the at least one solution option, wherein the probability of the availability of at least one parking space is used as an optimization parameter, the position of the at least one parking space relative to a destination is used as an additional optimization parameter, expressed as the duration until the arrival at the destination from the at least one parking space, and the drive duration from a starting location to the at least one parking space is used as an additional optimization parameter.

15 Claims, 2 Drawing Sheets

(51) Int. Cl.
   *G06Q 10/04* (2012.01)
   *G06Q 50/30* (2012.01)
   *G01C 21/36* (2006.01)
   *G01C 21/34* (2006.01)
   *G06N 7/00* (2006.01)

(52) U.S. Cl.
   CPC ..... *G01C 21/3605* (2013.01); *G01C 21/3617* (2013.01); *G01C 21/3679* (2013.01); *G06N 7/005* (2013.01); *G06Q 10/04* (2013.01); *G06Q 50/30* (2013.01)

(58) Field of Classification Search
   CPC .... G01C 21/3423; G01C 21/00; G06Q 10/04; G06Q 50/30; G06N 7/005
   USPC ........... 701/465, 532, 533; 340/932.2
   See application file for complete search history.

(56) References Cited

U.S. PATENT DOCUMENTS

| | | | |
|---|---|---|---|
| 2012/0209512 A1 | 8/2012 | Kujirai et al. | |
| 2013/0211705 A1 | 8/2013 | Geelen et al. | |
| 2014/0266800 A1* | 9/2014 | Koukoumidis | G08G 1/146 340/932.2 |
| 2014/0340242 A1* | 11/2014 | Belzner | G08G 1/143 340/932.2 |
| 2014/0350853 A1* | 11/2014 | Proux | G08G 1/096741 701/533 |
| 2015/0051833 A1* | 2/2015 | Geelen | G08G 1/14 701/532 |
| 2015/0123818 A1* | 5/2015 | Sellschopp | G08G 1/096816 340/932.2 |
| 2015/0217754 A1* | 8/2015 | MacNeille | B60L 58/10 701/22 |

FOREIGN PATENT DOCUMENTS

| | | |
|---|---|---|
| JP | 2011-75393 A | 4/2011 |
| JP | 2011-179932 A | 9/2011 |
| JP | 2012-167942 A | 9/2012 |
| JP | 2013-533964 A | 8/2013 |
| WO | WO 2011/157296 A1 | 12/2011 |

OTHER PUBLICATIONS

German-language Written Opinion (PCT/ISA/237) issued in PCT Application No. PCT/EP2016/081508 dated Mar. 15, 2017 (eight pages).

German-language Search Report issued in counterpart German Application No. 10 2015 225 893.9 dated Nov. 8, 2016 with partial English translation (14 pages).

Japanese-language Office Action issued in Japanese Application No. 2018-526841 dated Sep. 30, 2020 with English translation (12 pages).

German-language Office Action issued in German Application No. 16815837.6 dated Jun. 28, 2021 (seven (7) pages).

* cited by examiner

METHOD AND SYSTEM FOR OPTIMIZING THE PARKING SPACE SEARCH OF A VEHICLE, AND COMPUTER PROGRAM PRODUCT

CROSS REFERENCE TO RELATED APPLICATIONS

This application is a continuation of PCT International Application No. PCT/EP2016/081508, filed Dec. 16, 2016, which claims priority under 35 U.S.C. § 119 from German Patent Application No. 10 2015 225 893.9, filed Dec. 18, 2015, the entire disclosures of which are herein expressly incorporated by reference.

BACKGROUND AND SUMMARY OF THE INVENTION

The present invention relates to a method and a system for optimizing the search for a parking space for a vehicle and to a computer program product in this regard.

The constantly increasing number of vehicles and the rising population density mean that there are areas with temporarily less parking space than vehicles looking for a parking space. Today, services are already known that address this problem by virtue of a probability of finding a parking space at the side of the road being determined and this probability being displayed to the driver. In addition, digital road maps and navigation systems are known.

Today, navigation systems guide the driver such that it is ensured that the vehicle reaches the destination. Such an approach requires the final destination of the driver to be able to be reached with the vehicle. This presumption does not apply to many cases. In particular if parking spaces are scarce, the driver cannot normally park his vehicle directly at his destination.

It is an object of the present invention, therefore, to provide a solution by means of which the search for a parking space can be optimized.

The invention is based on the insight that this object can be achieved by virtue of one or more solution options being ascertained, wherein the probability of the availability is taken into consideration at least together with the relative position of the parking space in relation to a destination, in relation to a starting location and possibly in relation to at least one further parking space. From the solution options, the optimum solution option is then preferably selected. This can also be referred to as the optimization solution.

According to a first aspect, the object is therefore achieved by a method for optimizing the search for a parking space for a vehicle. The method is characterized in that the method involves at least one solution option being ascertained, an optimization solution being ascertained from this at least one solution option, wherein one optimization parameter used is the probability of the availability of at least one parking space, a further optimization parameter used is the relative position of the at least one parking space in relation to a destination, expressed as the time to reach the destination from the at least one parking space, and a further optimization parameter used is the journey time from a starting location at the at least one parking space.

The search for a parking space for a vehicle is preferably effected by the driver of the vehicle, who is provided preferably at least to some extent with information to improve the search for a parking space. By way of example, the search for a parking space may be supported by a driver assistance system or a navigation system. In the case of autonomous vehicles, the search for a parking space can also be effected by the vehicle itself using such driver assistance systems or navigation systems.

The method according to the invention involves at least one solution option being ascertained. From the at least one solution option, an optimization solution is then ascertained. The solution option denoted is an option, in particular a parking space that could possibly be suitable for being an optimization solution. The optimization solution denoted is a solution to an optimization problem.

The optimization problem denoted in this case is a stated problem or stated object that, when solved or achieved, leads to the driver's preferred selection of one or more parking spaces. The optimization problem formulated can be, by way of example, the problem that one or more optimization criteria are in a prescribed range or reach a particular numerical value. The optimization criteria understood are, according to the invention, the minimum time and/or a maximum demand on the driver, for example. The demand on the driver that is understood may be, in particular, his expectation of finding a parking space. The formulation understood for the optimization problem is, in particular, the specification of values, ranges or circumstances for optimization criteria for the desired optimization solution. The optimization solution is therefore preferably one or more parking spaces that meet or satisfy the optimization criteria defined more accurately in the optimization problem.

According to the invention, the ascertainment of the at least one optimization solution involves multiple optimization parameters being used. One optimization parameter used in this case is the probability of the availability of at least one parking space. The probability of the availability can be determined by using historically derived parking space finding probabilities from other services, for example. Additionally or alternatively, parking space availabilities currently reported online or foreseeable future parking space availabilities can be used to determine the probability. A parking space availability currently reported online may involve the reporting of a vehicle leaving a parking space or of someone nearby looking for a parking space who is observing the process of a parking space being left. The foreseeable future parking space availability can be ascertained by car sharing vehicles that will presumably soon leave a parking space or by drivers returning to a vehicle, for example.

A further optimization parameter used is the relative position of the at least one parking space in relation to a destination, expressed as the time to reach the destination from the at least one parking space. The time to reach the destination from the at least one parking space can also be referred to as time to destination.

The destination can be input into a navigation system, for example, by the driver of the vehicle.

The relative position of the parking space in relation to the destination can be determined by using digital maps or details from a navigation system. According to the present invention, the solution options are preferably ascertained by determining the distance of a parking space from a destination. This can be effected by determining a radius around a destination, for example. In addition, probabilities are preferably ascertained for possible parking spaces. Only if a parking space is within a prescribed radius around a destination, for example, and there is preferably a certain probability of availability is the parking space considered as a solution option that can then be used for ascertaining the optimization solution. According to the invention, the optimization parameter used for the optimization is the relative position of a parking space, that is to say of a solution option, in relation to the destination. In this case, however, it is not only the relative distance of the parking space from the destination, which can be prescribed by determining a radius around the destination, for example, that is used. According to the invention, preferably in addition to the determination of the distance of the parking space from the destination, in particular to ascertain solution options, the time to reach the destination from the parking space is ascertained as an optimization parameter. It may therefore also be possible for parking spaces that are locally further away from the destination, that is to say solution options, to be identified as a possible optimization solution to the optimization problem, if, for example on account of a short cut that can be reached on foot, it is possible to reach the destination in a shorter time than in the case of a parking space that is locally closer to the destination.

According to the invention, a further optimization parameter used is the journey time from a starting location to the at least one parking space. In this case, the journey time is understood to mean the time required in order to get from the starting location to at least one of the solution options, that is to say at least one parking space. The distance that needs to be covered in this case, which can also be referred to as the journey distance, can comprise the sum of the distances from the starting location to a first parking space and from the latter to a second parking space. The journey time in this case is the sum of the times needed for the individual partial distances. The starting location is understood to mean in particular a position from which the vehicle is within a defined radius around the destination. This radius can also be referred to as the destination area. The radius can be input by the driver or, according to the invention, may be preset in the system. The distance that a driver possibly needs to cover between his current position and the starting location can also be referred to as the initial journey distance.

In this case, the journey time denoted is the time needed by the driver of the vehicle in the vehicle from the starting location to an actually available parking space. If, by way of example, a parking space is identified for which the probability of its being available is low, then preferably at least one further parking space is identified at which the probability is higher, even if the journey time to this further parking space is longer than the journey time to the first identified parking space. The reason is that since the probability at the further parking space is higher, the journey time for this parking space may be higher yet the expectation of the driver can still be met.

By virtue of the present invention involving at least one optimization solution being ascertained from solution options, with both the journey time and the last bit between the parking space and the destination, that is to say the distance to destination, being taken into consideration and moreover the probability of availability being taken into consideration, the optimization solution leads to a reliable statement in regard to an optimum parking space and preferably to a reliable statement in regard to a route along which there is a high probability of finding a parking space that meets the expectations of the driver. In particular, the method according to the invention also allows parking spaces at least to be considered that would not be taken into consideration or detected in a conventional method on account of a greater distance to the destination.

Preferably, the optimization solution from the solution options is ascertained by virtue of an expectation value of the driver being taken into consideration. In the simplest embodiment, the expectation value is the product of probability of availability and time, namely the sum of the journey time and the time to destination. In this case, the driver may have prescribed whether the probability or the time is more important to him. That is to say that the weighting of the optimization parameters can be prescribed by the driver. This can be indicated by the driver by virtue of input into a navigation system or an input unit of the optimization system, for example. By way of example, the driver can indicate that the maximum search time needs to be minimized. In this case, a longer time to destination can be accepted if need be, but the probability of the availability of the parking space is maximized. In another case, the driver can indicate that the maximum time to destination needs to be minimized, for example. In that case, a longer search time can be accepted and the probability of the availability may be decreased.

According to a preferred embodiment, the outlay required to reach the destination from the at least one parking space is ascertained. According to one embodiment, the outlay in this case takes into consideration at least the time to reach the destination from the at least one parking space, that is to say the time to destination. In an alternative or additional embodiment, the outlay is used as a parameter in order to be able to ascertain the time to reach the destination from the at least one parking space, that is to say the time to destination. The outlay understood in this case is the outlay that exists for the respective driver. To ascertain the outlay, personal preferences and/or characteristics of the driver are therefore preferably used. As such, the maximum tolerated walking time can be taken into consideration for ascertaining the outlay, for example. In this case, the outlay serves as a limit value. Alternatively or additionally, the walking speed of the driver can be taken into consideration, for example. In this case, the outlay is used to determine the time to destination, that is to say that the latter is computed using the outlay. The outlay can also be referred to as costs and in particular as destination costs or walking costs. The outlay is expressed by a function, for example.

According to a further embodiment, the outlay required to reach the at least one parking space from a starting location is ascertained. According to one embodiment, the outlay in this case takes into consideration at least the journey time from the starting location to the at least one parking space, that is to say the at least one solution option. In an alternative or additional embodiment, the outlay is used to determine the journey time. The outlay understood in this case is the outlay that exists for the respective driver. To ascertain the outlay, personal preferences of the driver and/or characteristics of the vehicle are therefore preferably used. As such, the maximum fuel consumption tolerated by the driver can be taken into consideration when ascertaining the outlay, for example. In this case, the outlay serves as a limit value. Alternatively or additionally, the maximum speed of travel of the vehicle can be taken into consideration, for example. In this case, the outlay is used to determine the journey time, that is to say that the latter is computed using the outlay. The outlay can also be referred to as costs and in particular as journey costs. The outlay is expressed by a function, for example.

According to one preferred embodiment, the time to reach the destination from the at least one parking space is determined by taking into consideration at least one movement on foot. Therefore, the time to reach the destination is determined preferably by using paths that the driver can take on foot. Moreover, empirical values or other values from a database can be used in order to determine the time on foot.

Alternatively or additionally, according to one embodiment, at least one alternative type of transportation can be taken into consideration for determining the time to reach the destination from the parking space. The alternative type of transportation denoted is a type of transportation that is transportation neither on foot nor by means of the driver's own vehicle. An alternative type of transportation that may be considered is public means of transport, taxi and/or rented bicycles, for example. By virtue of alternative types of transportation being checked, the number of solution options can be increased, since a parking space that is admittedly further away but at which rented bicycles are available, for example, results in a shorter time to reach the destination from the parking space than a parking space that is admittedly closer to the destination but from which the distance to the destination has to be covered on foot.

According to one preferred embodiment, if at least two solution options are detected, these solution options are put into an order of optimization. In this case, multiple solution options can then be indicated, for example displayed, to the driver. Alternatively, however, it is also possible, when finding a solution option that is simultaneously an optimization solution for the formulated optimization problem, to output this optimization solution first of all and to ascertain further solution options and look for a further optimization solution only in the event of a failure, for example if the parking space was occupied contrary to an estimation of probability. The order of optimization into which the solution options can be put when multiple solution options are ascertained is understood in particular to mean prioritization according to one of the optimization criteria or a circumstance of the optimization criteria. The order of the solutions can be displayed or otherwise output to the driver of the vehicle, for example transmitted to a unit of a navigation system.

According to one embodiment, the first optimization solution indicated in the order of optimization is an optimization solution for which the expected total time, that is to say the sum of the journey time and time to destination, to reach the destination is shortest. In this case, the order of optimization is therefore determined by the optimization criteria of the time to reach the destination from the parking space and the search time for looking for the parking space. The optimization criterion of probability is treated as subordinate in this case.

According to a further embodiment, the first optimization solution indicated in the order of optimization is an optimization solution for which the probability of the availability of the at least one parking space is highest. In this embodiment, a parking space for which the availability of probability is high but that is at a relatively long distance from the destination may be preferred, for example, since the driver then certainly has a parking space and accepts the walk or transportation by alternative types of transportation.

As a result of probability being modeled, every order of optimization, that is to say every potential route, is provided with an expected total time, that is to say sum of journey time and time to destination. In addition, every order of optimization is provided with a maximum total time having at least one probability p and/or with a minimum total time having at least one probability p. The driver can therefore indicate which of the optimization criteria is meant to be definitive.

According to one preferred embodiment, a route is ascertained that covers the solution options in the order of optimization. In this case, the journey time from multiple solution options is added up. In particular, the journey time ascertained from the starting location to the first solution option needs to be summed with the time to reach a second solution option from the first solution option. This summed journey time therefore needs to be taken into consideration for an optimization based on the total time for the second optimization solution. The route can be output and in particular displayed or, in the case of fully automatic vehicles, prescribed via the navigation system of the vehicle, for example. This ensures that the driver or the vehicle travels along the solution options in the desired order, that is to say along a route defined by the solution options in the order of optimization.

In one embodiment of the method according to the invention, in which only one optimization solution is considered, that is to say a single optimum parking space is identified, it is possible for a suitable route to be ascertained for the individual vehicle to this optimum parking space.

According to one embodiment, the selection of the optimization solutions is made on the basis of a decision tree. The use of a decision tree has the advantage that not all possible combinations of routes along solution options need to be analyzed. Rather, weighting of the individual branches of the decision tree allows one or more solutions to the optimization problem to be found in discriminatory fashion. In particular, this involves a decision tree being used in which the root node indicates the starting point of the optimization, that is to say the point from which a parking space search is effected. The starting point of the optimization is normally different than the present location of the vehicle. The starting point of the optimization can be determined by means of simple consideration of distance, that is to say definition of a search area around the destination, for example. In this search area, the solution options, that is to say parking spaces, of which at least one has a probability of availability of 1 are then checked on the basis of the tree structure.

According to a further embodiment, the selection of the optimization solutions involves upper bounds and lower bounds for at least one optimization criterion being checked. This method of checking improves the result of the optimization, in particular the solution(s) to the optimization problem, further.

As a particular preference, what is known as a branch-and-bound method is used, that is to say that the optimization solutions are determined by using a decision tree and the comparison of upper bounds and lower bounds of different nodes. The optimization problem used in this case is preferably the expectation value of the driver. The driver preferably takes into consideration the probability of availability and also the journey outlay and the destination outlay. The use of a branch and bound method detects and eliminates less-than-optimum solutions, or the applicable branch is not pursued further. In the branch step, the optimization problem can be split into partial problems in this case. Alternatively, however, it is also possible for the tree structure to be determined in the branch step by splitting the possible parking spaces based on a different order. The bound step involves determining which branches of the decision tree are not pursued further. This limits the computation complexity. Preferably, this involves an upper bound value (upper bound UB) and a lower bound value (lower bound LB) being computed and the values of the respective node, in particular the expectation values of the respective node, being compared with bound values of a further node.

According to a further aspect, the present invention relates to a system for optimizing the search for a parking space for a vehicle. The system is characterized in that the system comprises at least one solution unit for ascertaining at least one optimization solution from at least one solution option, at least one determination unit for determining the probability of the availability of at least one parking space, at least one ascertainment unit for ascertaining the time to reach the destination from the parking space and at least one computation unit for computing the journey time from a starting location to at least one parking space, and the solution unit is connected to the determination unit, the ascertainment unit and the computation unit.

The units of the system according to the invention may be embodiment as separate units. However, it is also within the scope of the invention for at least some of the units to be combined. At least some of the units may be implemented as software.

The determination unit for determining the probability of availability is preferably connected to at least one database and/or a service server, and can be provided with current and/or historical data pertaining to the availability of a parking space via the connection.

At least the ascertainment unit for ascertaining the time to reach the destination from the parking space and/or the computation unit for computing the journey time from a starting location to at least one parking space is preferably connected to a further database that stores preferences of the driver, characteristics of the driver and/or the vehicle, for example.

By virtue of the solution unit being connected to the further units of the system, the probability of availability and also the journey time and the time to reach the destination from the parking space can be taken into consideration when ascertaining the at least one optimization solution from at least one solution option. The solution unit may moreover be connected to at least one database, which may store preferences of the driver, for example, and the information on preferences that is obtained from this database can be used to formulate the optimization problem in the solution unit as appropriate. Additionally, according to one embodiment, the solution unit or a further unit of the system is preferably connected to a database that contains at least information pertaining to alternative means of transportation at parking spaces. The geographical details required for identifying parking spaces and computing the different lengths of time (journey time and time to destination) are preferably obtained from a digital map.

According to one preferred embodiment, the system comprises a navigation system or has at least one interface for communication with a navigation system. The connection of the system to a navigation system or the integration of the system in a navigation system has the advantage that, firstly, required information, such as positions of parking spaces, the destination, road profiles, walk profiles and the like, can be obtained from the system easily. Moreover, a navigation system is normally provided with an output unit for visual and/or audible output of information. This output unit can be used by the system according to the invention and can be used to output the optimization solutions, for example in the form of a route.

According to a further aspect, the invention relates to a computer program product that can be loaded into a digital computer or computer system, in particular into the internal memory, and comprises software code sections that are used to carry out the steps of the method according to the invention when the product runs on the computer or computer system.

The computer or computer system may be the computer unit of the system according to the invention and preferably the computer unit of a navigation system, for example.

The software code sections can also be referred to as an algorithm. Preferably, the computer program product comprises at least two software code sections, one being used to determine the probability and at least one other being used to determine the lengths of time (journey time, time to destination) and/or to determine the outlay (journey outlay, destination outlay).

The computer program product and in particular the software code sections preferably have at least one interface to a navigation system of the vehicle. This interface may be stored as a call command in the software code section. This interface can be used to request the map data needed for the method according to the invention or other information, such as the position of the destination, for example, from the navigation system.

Advantages and features that are described for the method according to the invention or the system according to the invention also apply—where applicable—to the computer program product according to the invention, and vice versa in each case. The advantages and features may be described only once in this case.

The present invention therefore provides a way of providing assistance for how a parking space can be found firstly quickly and secondly not too far from the destination in the event of a space for the vehicle being sought at a location with too few parking spaces on the road. In particular, the present invention allows a route to be generated for the "last mile" to a destination in a vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
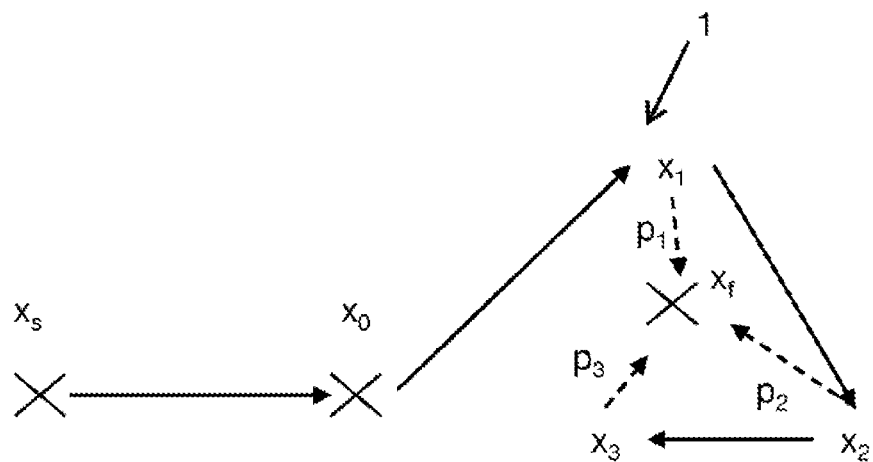
FIG. 1 shows a schematic depiction of multiple positions of a vehicle.

FIG. 1 shows a possible route of a vehicle by indicating positions x. The vehicle (not depicted) is at the position $x_s$, for example. As a destination, which can also be referred to as the final position, the driver indicates the position $x_f$. This indication can be input by the driver into a navigation system of the vehicle, for example. If there is no parking space or at least no parking space available at the position $x_f$, the driver needs to look for options. In the scenario shown in FIG. 1, multiple parking spaces are detected close to the destination. The parking spaces are at the positions $x_1$, $x_2$, $x_3$. Without using the method according to the invention, the driver would probably travel along the parking spaces, which are also referred to as options, in the order $x_1$, $x_2$ and then $x_3$. There is a probability $p_1$ of the driver successfully being able to park at $x_1$ in this case and being able to walk from there to $x_f$. If the driver is unsuccessful, he drives on to $x_2$ and continues to proceed in that way.

In the case of this approach, it may be that the driver unnecessarily drives to the positions $x_1$ and $x_2$ when their probability of availability is too low or chooses the parking space at position $x_1$ even though the parking space at $x_2$ is at a shorter relative distance from the destination $x_f$.

This problem is addressed by the present invention.

In particular, the invention solves an optimization problem in which at least the optimization parameters of probability of availability, journey time and relative position of the parking space in relation to the destination are taken into consideration.

Preferably, the method according to the invention involves some conditions that need to be observed being prescribed:

1) Presence of a set of solution options, $x_1, \ldots, x_n$, with probabilities $\vec{p} = [p_1 \ldots p_n]$ of success. The solution options, which are also referred to as options below, are parking spaces, in particular.

2) The problem must be solvable. According to the invention, at least one of the options must have a probability of success of 1. By way of example, there may be a parking garage. If none of the options has a probability of success of 1, then it is possible that the driver will not find a parking space.

3) Presence of a cost function $c_w(j)$ where $1 \le j \le n$ that quantifies the costs of walking from $x_j$ to $x_f$. The costs can also be referred to as outlay. The cost function is taken into consideration in particular when determining the optimization parameter of the relative position of the parking space in relation to the destination. Apart from the distance of the destination from the parking space, preferably the time, that is to say the length of time, that is needed in order to get from the parking space to the destination, in particular to walk thereto, is indicated as a cost function. In this case, it is possible to take into consideration the outlay, for example the walking speed of the driver.

4) Preferably, the invention also provides a cost function $c_d(i, j, s)$ where $0 \le j$, $i \le n$ that quantifies the costs in order to drive from $x_j$ to $x_i$ if the current location of the vehicle is $s$. This location can be used to distinguish between directions in which the vehicle is pointing, for example. For example, it is possible for the costs to be different for a vehicle that is pointing in the direction of north in the left-hand lane and a vehicle that is pointing south in the right-hand lane. Moreover, the costs, which are also referred to as outlay, are also used for determining the optimization parameter of the search time. By way of example, the possible speed of travel or the reasonable fuel costs prescribable by the driver can be taken into consideration.

The present invention makes it possible to find an optimum order of solution options that minimizes the costs to be expected for the trip from $x_0$, that is to say the starting location, to $x_f$.

According to the invention, in this regard it is preferably assumed that $\pi: \{1, \ldots, n\} \to \{1, \ldots, n\}$ is a permutation that describes the order. The aim in this case is to find the permutation that minimizes the following:

$$\operatorname*{argmin}_{\pi} E(\pi, \vec{p})$$

With definition (1), which corresponds to the expectation value of the driver, $$E(\pi, \vec{p}) = P_{\pi_1}(c_d(0, \pi_1) + cw(\pi_1)) + P_{\pi_2}(c_d(\pi_1, \pi_2) + cw(\pi_2)) + P_{\pi_3}(c_d(\pi_2, \pi_3) + cw(\pi_3)) + \ldots$$

with $$\pi(j) = \pi_j$$

and definition 2:

$$P_{\pi_1} = p_{\pi_1}$$
$$P_{\pi_2} = (1 - P_{\pi_1}) p_{\pi_2}$$
$$P_{\pi_3} = (1 - P_{\pi_1} - P_{\pi_2}) p_{\pi_3}$$
$$P_{\pi_4} = (1 - P_{\pi_1} - P_{\pi_2} - P_{\pi_3}) p_{\pi_4}$$
$$\ldots$$
$$P_{\pi_j} = (1 - P_{\pi_1} - \ldots - P_{\pi_{j-1}}) p_{\pi_j}$$

$P_{\pi_j}$ defines the probability of the j-th attempt being successful after j−1 unsuccessful attempts beforehand.

Naturally, $\Sigma_{j=1}^n P_{\pi_j} = 1$: if at least one k exists for which $p_{\pi_k} = 1$. Without losing general validity, it is assumed that k=n.

$$s1 + P1w1 + P2(t12 + w2) + P3(t12 + t23 + w3) + \ldots$$

$$S1 + P1w1 + P2w2 + P3w3 + \ldots P2t12 + P3(t12 + t23) + \ldots$$

$$s1 + P1w1 + (1-P_1)t_{12} + P2w2 + (1-P_1-P_2)t_{23} + P3w3 + (1-P_1-P_2-P_3)t_{34} + \ldots$$

The optimum permutation $\tilde{\pi}$, that is to say the optimization solution, can be found by evaluating all permutations. These may be numerous, however. For n options, it is necessary for n! different permutations to be checked.

Figure 2:
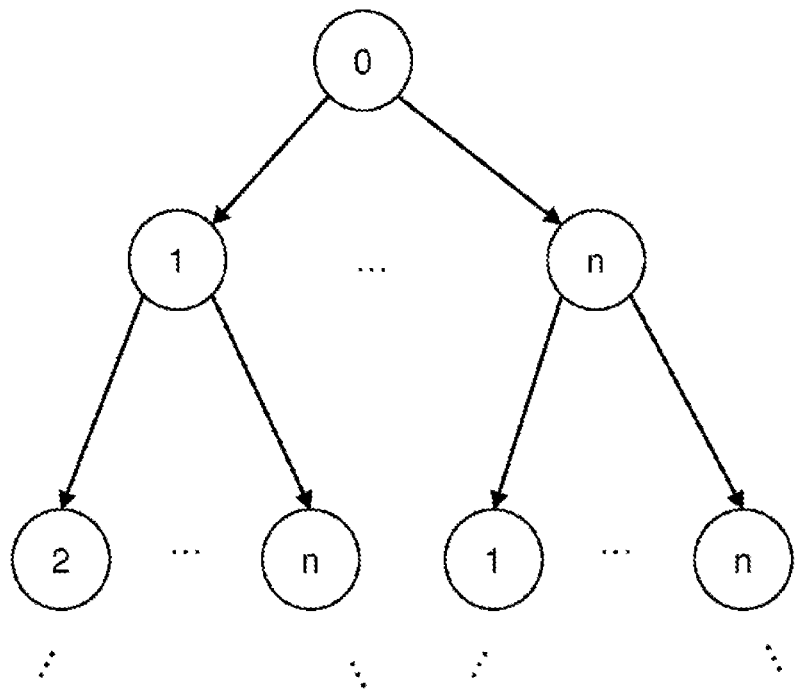
FIG. 2 shows a schematic depiction of a decision tree.

To obtain a suitable solution in an acceptable time, the invention preferably uses a branch and bound scheme. FIG. 2 is a schematic depiction of a decision tree.

Clearly, the root node at which the optimization begins, and which is also referred to as the starting location, is $x_0$ (depicted as 0). From this starting location, multiple decisions are possible. In particular, the parking space $x_1$ comes into consideration as one option. The parking spaces $x_2$ and $x_3$ could also come into consideration.

According to the invention, an intelligent path is now used to find the best permutation without examining the entire decision tree. This can be achieved by means of the branch and bound scheme.

A set of options of size N is considered and it is assumed that $\vec{p} = [p_1 \ldots p_N]^T$ indicates the availability/probability of success for each option. In this case, it is assumed that N is large enough for at least one j to exist for which $p_j = 1$.

Moreover, $\tilde{\pi} = [\tilde{\pi}_1 \ldots \tilde{\pi}_n]^T$ is supposed to indicate the optimum permutation of all options such that $E(\tilde{\pi}) \le E(*)$.

It is clear that:
n≤N and
$p_{\tilde{\pi}_n} = 1$ and also
$p_j < 1$ for $j \in \{p_{\tilde{\pi}_1}, \ldots, p_{\tilde{\pi}_{n-1}}\}$ For the trivial evidence, definitions (1) and (2) are checked. If there is an option $\pi_j$ with $p_{\tilde{\pi}_n} = 1$ and j<1, then $P_n = 0$ and option $\tilde{\pi}_\pi$ has no influence on $E(\pi)$ and can accordingly be removed from the optimum solution. On the other hand, if $p_{\tilde{\pi}_n} \ne 1$, there continues to be further options that influence $E(\pi)$ and need to be examined. Therefore, $\tilde{\pi}_\pi$ cannot be optimum.

If, moreover, it is indicated that $p_{\tilde{\pi}_j} = 1$ with j<n, then a lower bound (LB) can be provided for the optimum solution using the same argument. To that effect, $\vec{p}^j = [p_1 \ldots p_{\pi_{j-1}} 1 \; p_{\pi_{j+1}} \ldots p_N]^T$ is supposed to indicate the artificial set of probabilities.

In that case, $$E(\check{\pi},\vec{p}^j) \leq E(\check{\pi},\vec{p})$$

This is easy to understand. The general situation in which all options have been taken into consideration improves with the change from $\vec{p}$ to $\vec{p}^j$ and therefore the costs to be expected for the optimum solution cannot be greater. Or in other words, if this is not the case, then it is better if there is no success with the option $\pi_j$, which is an inconsistency for the optimum of $\check{\pi}$.

It should be noted that $E(\check{\pi},\vec{p}^j)$ can be evaluated without taking into consideration $\pi_j, \ldots, \pi_n$.

Moreover, an upper bound (UB) is preferably determined. If the following less-than-optimum solution $\pi' = [\check{\pi}_1 \ldots \check{\pi}_{j-1}\check{\pi}_n]^T$ is constructed, then $E(\check{\pi},\vec{p}) \leq E(\pi',\vec{p})$ This is simple to identify. We have just changed the optimum permutation to another permutation. Since $p_{\pi_n} = 1$, it is possible to stop thereafter.

Figure 3:
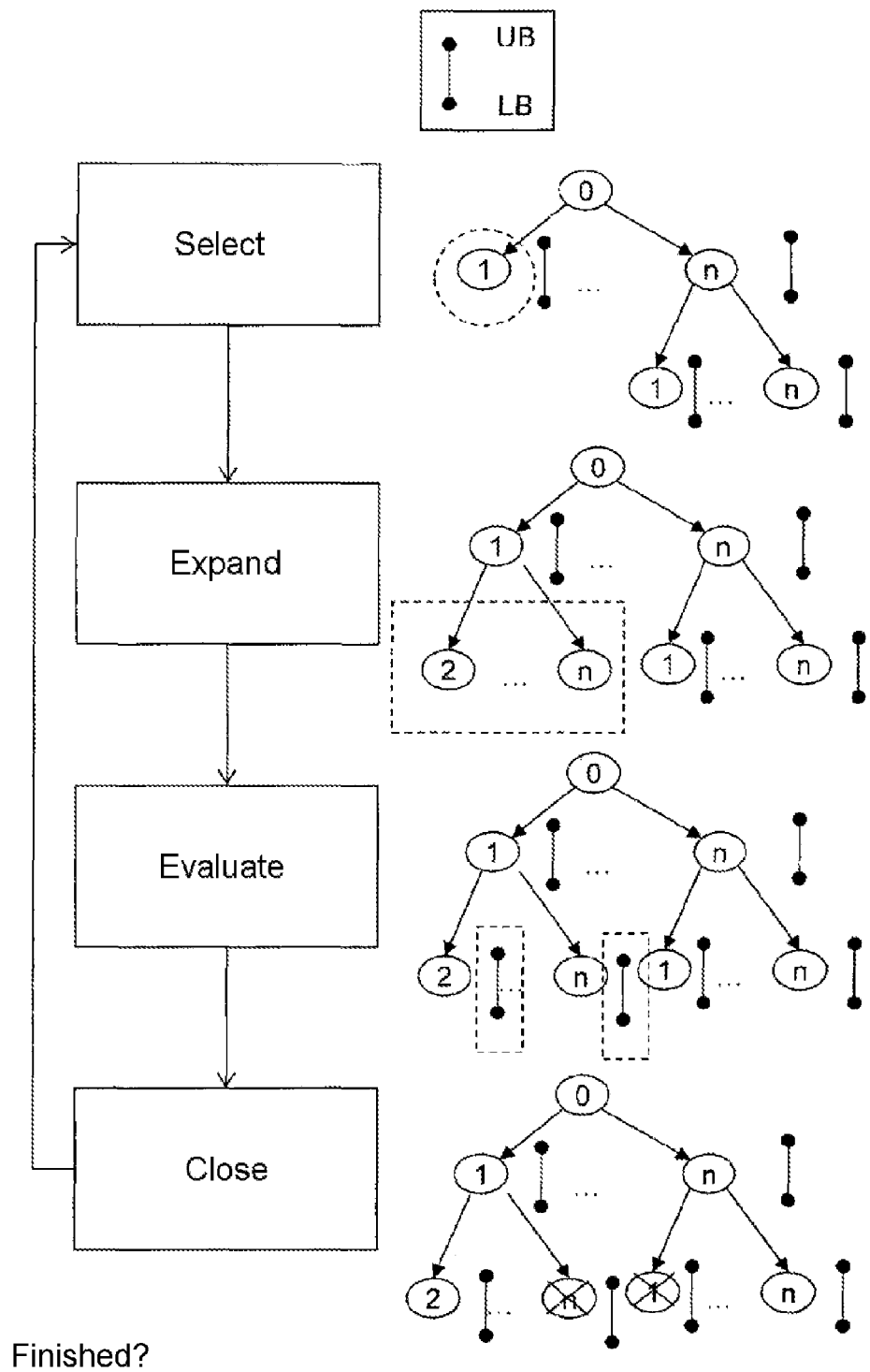
FIG. 3 shows a schematic depiction of a check on a decision tree.

For the optimization, it is a matter of how the optimum permutation is found without examining the entire decision tree that has been presented above. This is achieved by the steps shown in FIG. 3:
1) If not unfinished, the most promising node needs to be identified.
2) The identified node is expanded.
3) The freshly expanded nodes are evaluated and the upper bound and lower bound are computed.
4) Based on UB/LB, nodes that may not be optimum are closed and removed from t.

The present invention entails, inter alia, the advantage that it saves time for the driver. Moreover, traffic and emission savings can be attained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for optimizing a search for a parking space for a vehicle, the method comprising the steps of:
   ascertaining, using a processor, at least one solution option;
   ascertaining, using the processor, an optimization solution from said at least one solution option;
   ascertaining, using the processor, an outlay including destination costs and/or walking costs to reach the destination from the at least one parking space taking into consideration at least the time to reach the destination from the at last one parking space;
   outputting, using a device communicably coupled to the vehicle, the optimization solution visually or audibly, wherein
      a first optimization parameter used is a probability of availability of at least one parking space determined by retrieving current or historical availability data via a connection to a server,
      a second optimization parameter used is a relative position of the at least one parking space in relation to a destination determined from a digital map, navigation system, or interface that is communicably coupled to a navigation system, expressed as the time to reach the destination from the at least one parking space, and
      a third optimization parameter used is a journey time from a starting location to the at least one parking space,
      the at least one solution option is a first solution option, and
      ascertaining a second solution option that is located further from the destination than the first solution option and requires a shorter time to reach the destination than the first solution option.

2. The method as claimed in claim 1, further comprising the step of:
   ascertaining an outlay required to reach the destination from the at least one parking space taking into consideration at least the time to reach the destination from the at least one parking space.

3. The method as claimed in claim 2, further comprising the step of:
   ascertaining an outlay required to reach the at least one parking space from a starting location taking into consideration at least the journey time from the starting location to the at least one parking space.

4. The method as claimed in claim 3, wherein
   the ascertainment of the journey time involves at least a sum of times needed to traverse each of a plurality of partial distances between at least two parking spaces being used.

5. The method as claimed in claim 1, wherein
   the time to reach the destination from the at least one parking space is determined by taking into consideration a movement on foot and at least one alternative type of transportation that is neither the vehicle nor on foot.

6. The method as claimed in claim 1, wherein
   at least two solution options are ascertained and said two solution options are put into an order of optimization.

7. The method as claimed in claim 6, wherein
   the first optimization solution specified in the order of optimization is an optimization solution for which an expected total time to reach the destination is shortest or for which the journey time or the time to reach the destination from the parking space is shortest.

8. The method as claimed in claim 6, wherein
   the first optimization solution specified in the order of optimization is an optimization solution for which the probability of the availability of the at least one parking space is highest.

9. The method as claimed in claim 6, further comprising the step of:
   determining a route that covers the two solution options in the order of optimization.

10. The method as claimed in claim 1, wherein
    a selection of the optimization solutions is made based on a decision tree.

11. The method as claimed in claim 10, wherein
    the selection of the optimization solutions involves upper bounds and lower bounds for at least one optimization parameter being checked.

12. The method as claimed in claim 1, further comprising:
    ascertaining an expectation value of a user that is a product of the probability of availability and the sum of:
       the time to reach the destination from the at least one parking space, and
       the journey time from the starting location to the at least one parking space.

13. A system for optimizing a search for a parking space for a vehicle, comprising:

one or more computers operatively configured to execute a program to:
- ascertain, using the one or more computers, at least one solution option;
- ascertain, using the one or more computers, an optimization solution from said at least one solution option;
- ascertain, using the one or more computers, an outlay including destination costs and/or walking costs to reach the destination from the at least one parking space taking into consideration at least the time to reach the destination from the at last one parking space; and
- output, using a device communicably coupled to the vehicle, the optimization solution visually or audibly, wherein
  - a first optimization parameter used is a probability of availability of at least one parking space determined by retrieving current or historical availability data via a connection to a server,
  - a second optimization parameter used is a relative position of the at least one parking space in relation to a destination determined from a digital map, navigation system, or interface that is communicably coupled to a navigation system, expressed as the time to reach the destination from the at least one parking space,
  - a third optimization parameter used is a journey time from a starting location to the at least one parking space, and
  - the time to reach the destination from the at least one parking space is determined by taking into consideration a movement on foot and at least one alternative type of transportation that is neither the vehicle nor on foot.

14. The system as claimed in claim 13, wherein
the at least one solution option is a first solution option; and the method further comprises:
ascertaining a second solution option that is located further from the destination than the first solution option and requires a shorter time to reach the destination than the first solution option.

15. A computer program product comprising a non-transitory computer readable medium having stored thereon software code sections that, when executed by one or more computers, carries out the steps of:
- ascertaining, using the one or more computers, at least one solution option;
- ascertaining, using the one or more computers, an optimization solution from said at least one solution option;
- ascertaining, using the one or more computers, an outlay including destination costs and/or walking costs to reach the destination from the at least one parking space taking into consideration at least the time to reach the destination from the at last one parking space; and
- outputting, using a device communicably coupled to the vehicle, the optimization solution visually or audibly, wherein
  - a first optimization parameter used is a probability of availability of at least one parking space determined by retrieving current or historical availability data via a connection to a server,
  - a second optimization parameter used is a relative position of the at least one parking space in relation to a destination determined from a digital map, navigation system, or interface that is communicably coupled to a navigation system, expressed as the time to reach the destination from the at least one parking space, and
  - a third optimization parameter used is a journey time from a starting location to the at least one parking space, and
- ascertaining an expectation value of a user that is a product of the probability of availability and the sum of:
  - the time to reach the destination from the at least one parking space, and
  - the journey time from the starting location to the at least one parking space.

* * * * *